US012639671B2

(12) United States Patent
Jonnalagadda

(10) Patent No.: US 12,639,671 B2
(45) Date of Patent: May 26, 2026

(54) PROJECT MANAGEMENT SEARCH ENGINE

(71) Applicant: Hexagon Technology Center GmbH, Heerbrugg (CH)

(72) Inventor: Ravi S. Jonnalagadda, Waltham, MA (US)

(73) Assignee: Hexagon Technology Center GmbH, Heerbrugg (CH)

( * ) Notice: Subject to any disclaimer, the term of this patent is extended or adjusted under 35 U.S.C. 154(b) by 275 days.

(21) Appl. No.: 18/138,603

(22) Filed: Apr. 24, 2023

(65) Prior Publication Data

US 2024/0354704 A1     Oct. 24, 2024

(51) Int. Cl.
| | |
|---|---|
| *G06Q 10/10* | (2023.01) |
| *G06F 16/953* | (2019.01) |
| *G06Q 10/06* | (2023.01) |
| *G06Q 30/02* | (2023.01) |
| *G06Q 30/06* | (2023.01) |
| *G06Q 50/08* | (2012.01) |

(52) U.S. Cl.
CPC ......... *G06Q 10/103* (2013.01); *G06F 16/953* (2019.01); *G06Q 50/08* (2013.01)

(58) Field of Classification Search
CPC .. G06Q 10/103; G06Q 50/08; G06Q 10/0631; G06F 16/953
USPC .......................................... 705/1.1–912, 301
See application file for complete search history.

(56) References Cited

U.S. PATENT DOCUMENTS

| | | | |
|---|---|---|---|
| 2005/0234761 A1* | 10/2005 | Pinto .................. | G06Q 10/0635 705/7.31 |
| 2008/0313110 A1* | 12/2008 | Kreamer ............ | G06Q 10/1097 706/14 |
| 2010/0131314 A1* | 5/2010 | Lo Yuk Ting ....... | G06Q 10/063 705/7.11 |
| 2010/0199258 A1* | 8/2010 | Lindley .................. | G06Q 10/06 717/105 |
| 2013/0159242 A1* | 6/2013 | Rahmouni ....... | G06Q 10/06313 706/52 |

(Continued)

OTHER PUBLICATIONS

International Search Report and Written Opinion for U.S. Patent Application No. PCT/US2024025327 dated Aug. 2, 2024 12 pages.

*Primary Examiner* — Jonathan P Ouellette
(74) *Attorney, Agent, or Firm* — Nutter McClennen & Fish LLP

(57) ABSTRACT
A method associates a historical scenario with historical actions and historical project results with the historical actions. The method generates a project management interface and receives a search request. The method matches the search request to the historical scenario. The method determines possible actions and, for each possible action, determines intermediate project results. Each of the intermediate project results includes an intermediate cost result, an intermediate scope result, and an intermediate schedule result. The method estimates final project results for the possible actions using the historical project results, each of the final project results including a final cost result, a final scope result, and a final schedule result. The method scores the possible actions according to at least one of the intermediate project results or the estimated final project results. The method updates the project management interface in response to scoring the possible actions.

20 Claims, 6 Drawing Sheets

100 Project Management System

| 110 Data Storage Circuit | 120 Interface Circuit |
|---|---|
| 130 Request Analysis Circuit | 140 Scoring Circuit |

101 User Device

(56)        References Cited

U.S. PATENT DOCUMENTS

| | | | |
|---|---|---|---|
| 2015/0121332 A1* | 4/2015 | Bhattacharyya | .......... G06F 8/77 |
| | | | 717/101 |
| 2021/0142286 A1 | 5/2021 | Hajian | |
| 2024/0185183 A1* | 6/2024 | Abraham | ......... G06Q 10/06313 |

* cited by examiner

201 — Organize Data Storage

203 — Generate User Interface

205 — Receive Search Request

207 — Match Search Request

209 — Determine Possible Actions

211 — Determine Intermediate Results

213 — Estimate Final Results

215 — Score Possible Actions

217 — Update the User Interface

200

400

401

403

PROJECT MANAGEMENT SEARCH ENGINE

FIELD

Illustrative embodiments of the invention generally relate to project management and, more particularly, various embodiments of the invention relate to using a search engine to respond to unplanned scenarios arising during a project.

BACKGROUND

Designing, scheduling, and managing the construction of large-scale construction projects requires coordination between numerous entities. Unplanned events which requires deviation from the construction plan may significantly impact the cost, schedule, and scope of the project. A project manager should respond to these deviations with a course of action which minimizes the effect on the overall project goals.

SUMMARY OF VARIOUS EMBODIMENTS

In accordance with one embodiment of the invention, a method associates, using a data storage circuit, a historical scenario with historical actions. The method associates, using the data storage circuit, historical project results with the historical actions, the historical project results including a cost result, a scope result, and a schedule result. The method generates a project management interface. The method receives a search request from the project management interface. The method matches the search request to the historical scenario. The method determines possible actions, using the historical actions associated with the historical scenario, in response to matching the search request to the historical scenario. The method determines intermediate project results for the possible actions, each of the intermediate project results including an intermediate cost result, an intermediate scope result, and an intermediate schedule result. The method estimates final project results for the possible actions using the historical project results, each of the final project results including a final cost result, a final scope result, and a final schedule result. The method scores the possible actions according to at least one of the intermediate project results or the estimated final project results. The method updates the project management interface in response to scoring the possible actions.

In some embodiments, the method ranks the possible actions using the scoring. Updating the project management interface includes outputting a ranking of at least a portion of the possible actions based on the scoring.

In some embodiments, the method selects the portion of the possible actions based on the scoring exceeding a minimum benefit threshold.

In some embodiments, the method assigns weights to the final cost result, the final scope result, and the final schedule result, wherein scoring the possible actions is further using the assigned weights.

In some embodiments, the method assigns a categorical tag to the first historical scenario and a second historical scenario, the second historical scenario being associated with a second historical actions. Determining the possible actions may include using the second historical actions in response to matching the categorical tag.

In some embodiments, after updating the project management interface, the method receives a user input including an additional possible action and a selection of the additional possible action. The method may also add the additional possible action to the historical actions.

Estimating the final project result for one of the possible actions may include training a machine learning model using historical project results and the historical actions; inputting one possible action of the possible actions into the machine learning model; and outputting the estimated final project result for the one possible action.

Updating the project management interface may occur in response to determining a system confidence score is less than a confidence threshold and a user competency score is greater than a competency threshold.

In accordance with another embodiment of the invention, a project management system has a data storage circuit to store a historical scenario, historical actions associated with the historical scenario, and historical project results associated with the historical actions, the historical project results including a cost result, a scope result, and a schedule result. The project management system has a project management interface circuit to generate a project management interface. The project management system has a request analysis circuit to receive a search request from the project management interface, match the search request to the historical scenario, and determine possible actions, using the historical actions associated with the historical scenario, in response to matching the search request to the historical scenario. The project management circuit has a scoring circuit to determine intermediate project results for the possible actions, each of the intermediate project results including an intermediate cost result, an intermediate scope result, and an intermediate schedule result. The scoring circuit also estimates final project results for the possible actions using the historical project results, each of the final project results including a final cost result, a final scope result, and a final schedule result. The scoring circuit also scores the possible actions according to at least one of the intermediate project results or the estimated final project results. The project management interface circuit updates the project management interface in response to scoring the possible actions.

The scoring circuit may rank the possible actions using the scoring. Updating the project management interface may include outputting a ranking of at least a portion of the possible actions based on the scoring.

The scoring circuit may select the portion of the possible actions based on the scoring exceeding a minimum benefit threshold.

The scoring circuit may assign weights to the final cost result, the final scope result, and the final schedule result, and scores the possible actions according to the assigned weights.

In some embodiments, the data storage circuit assigns a categorical tag to the first historical scenario and a second historical scenario, the second historical scenario being associated with a second historical actions. Determining the possible actions may include using the second historical actions in response to matching the categorical tag.

Estimating the final project result for one of the possible actions may include training a machine learning model using historical project results and the historical actions; inputting one possible action of the possible actions into the machine learning model; and outputting the estimated final project result for the one possible action.

Updating the project management interface may occur in response to determining a system confidence score is less than a confidence threshold or a user competency score is greater than a competency threshold.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
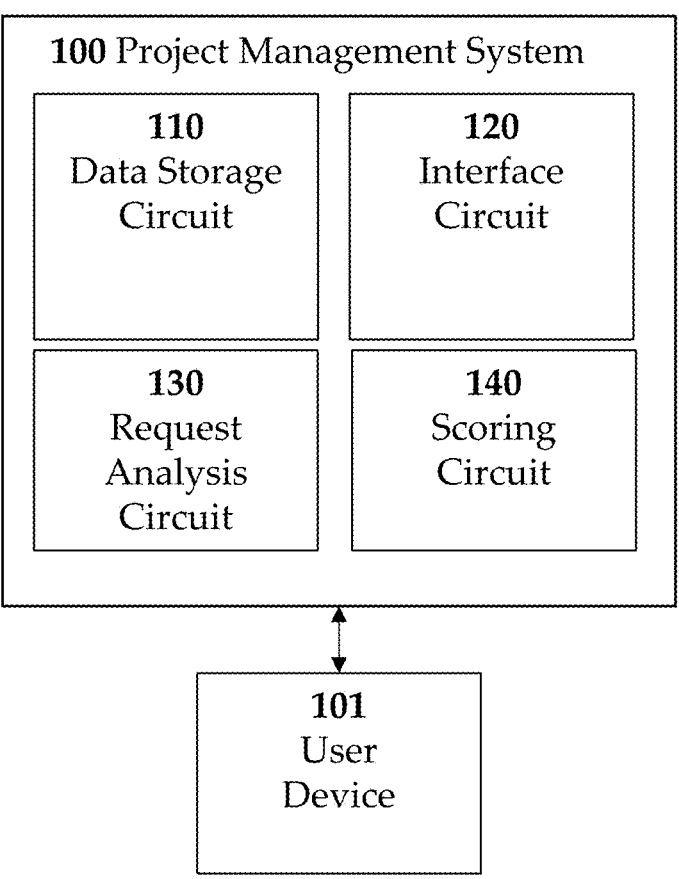
FIG. 1 schematically shows a project management system in accordance with various embodiments.

In illustrative embodiments, a method fulfills a search request for possible responses to a scenario during the course of a project. When the user encounters an unplanned event (scenario) during the course of a project, the user may search for possible actions to take in response. After receiving a search request, a project management system may use historical project data to score and rank the possible actions. The user may use the search results to select the best option available. Details of illustrative embodiments are discussed below.

A project manager is tasked with completing a project in accordance with a set of goals. In some embodiments, the project may be, among other things, a construction project, such as the construction of power plants, airports, skyscrapers, hospitals, schools, bridges, ships, manufacturing plants, and shipyards. While the illustrative examples described herein are related to construction projects, it should be appreciated that the project management system 100 may be used in other applications, such as a software design project or product manufacturing, among other things.

The goals of a construction project may include a cost goal, or budget, which may be an amount of money the owners agree to pay the builders for completing the project. Construction project goals may also include a schedule goal, which may be an expected date of completion for the project. Construction project goals may also include a scope goal, which specifies the work which needs to be completed to finish the project. It should be appreciated constructions projects may be managed according to other goals and where cost, scope, and schedule results are discussed below, results related to other goals may be included in or substituted into other embodiments.

Each project may be divided into smaller tasks, called activities, also known as work packages. As an example, where the project is constructing a bridge, one activity may be excavating the worksite. In order to complete the project, each activity must be completed. Activities may need to be completed in a particular order, within a particular timeframe, or subject to other parameters, such as weather, labor availability, or equipment availability, among other things. It should be appreciated that activities may be further divided into sub-activities, or tasks, all of which herein will be referred to generally as activities.

Oftentimes, unplanned events, herein referred to as scenarios, occur which effect the ability to work on or complete one of the activities of the project. For example, rainfall may prevent a contractor tasked with an excavating activity from working on a scheduled day. As in the example, a scenario may delay the project, hindering the project from reaching its goals. However, another scenario may further the goals of the project. For example, excavating equipment may become available sooner than expected, allowing a contractor to begin work a week early. A scenario may be unplanned in the sense that is unexpected (rainfall) or merely that the project manager has yet to complete the plan (e.g., hiring personnel for the project).

To progress towards the goals of the project, the project manager may need to respond to scenarios in a manner which increases the likelihood the project will either reach its goals, or minimize the deviation from the goals, herein called an action.

The project manager may be able to respond to the scenario with one of multiple actions. For example, when a piece of equipment is not available on the day it is needed according to the project schedule, the project manager may send everyone home, assign work which may be completed while waiting for the equipment to arrive, or purchase equipment or materials from another vendor for an immediate delivery for an additional cost. An action may have an impact on the result of the project, such as a change to the cost, the schedule, or the scope. The impact may have an intermediate project result, where the result is observed at some time before the project is completed. The impact may also have a cascading impact realized after the time considered for the intermediate project results. In some embodiments, the impact considered at a time after the intermediate project results time is also known as the final project results. In some embodiments, the final project results is evaluated at the time of the completion of the project.

FIG. 1 schematically shows a project management system 100 configured to fulfill scenario response search requests for a project manager. Although the user of the system 100 is referred to as a project manager, it should be understood the system may be used by another type of user. In the illustrated embodiment, the project management system 100 is configured to provide a graphical user interface to a user device 101 configured to display the interface, receive a search request from a user, and provide the search request to the project management system 100. In other embodiments, the project management system 100 may include an output device to display the graphical user interface to the user.

The project management system 100 has a data storage circuit 110 configured to store historical data, among other things of previous projects on a non-transitory computer readable medium.

The project management system 100 has a project management interface circuit 120 configured to generate a graphical user interface for a project manager, also known as a project management interface 400. The project management interface circuit 120 includes an element on the project management interface 400 allowing the user to submit a search request indicating a scenario. The project management interface circuit 120 may update the project management interface 400 to include search results of the search request.

The project management system 100 has a request analysis circuit 130 which receives the search request from the project management interface 400 displayed on the user device 101. The request analysis circuit 130 also receives data from the data storage circuit 110 to match historical project data with the current scenario and determine possible actions for responding to the current scenario based, at least in part, on previous actions taken to address scenarios like the current scenario.

The project management system 100 has a scoring circuit 140 which receives the possible actions from the request analysis circuit 130 and assigns a score to each possible action. The scoring may be used to rank the possible actions, to filter out some of the possible actions before present the actions to a user, or to determine the user should receive a prompt with or without the search results.

In certain embodiments, one of the circuits of the project management system, such as the scoring circuit 140 or the request analysis circuit 130, may use a machine learning model to analyze data such as the historical project data stored on the data storage circuit 110. The machine learning model may include a supervised learning model, unsupervised learning model, or semi-supervised learning model. For the supervised learning model, the corresponding circuit may train the model using a labeled data set derived from the historical project data including historical results, then input data for the current project into the trained model and receive an estimation of results for the current project. The supervised machine learning model may use a neural network, a Naive Bayes, or a support vector machine, among other things.

For an unsupervised learning model, the corresponding circuit may use unlabeled data derived from the historical project data, among other things, to form clusters based on common data attributes. The machine learning model may use a k-means clustering algorithm, principal component analysis, or hierarchical clustering, among other things.

For a semi-supervised learning model, the corresponding circuit may use partially labeled data derived from the historical project data, among other things, to form clusters based on common data attributes. The machine learning model may use generative models or heuristic self-training algorithms, among other things.

Figure 2:
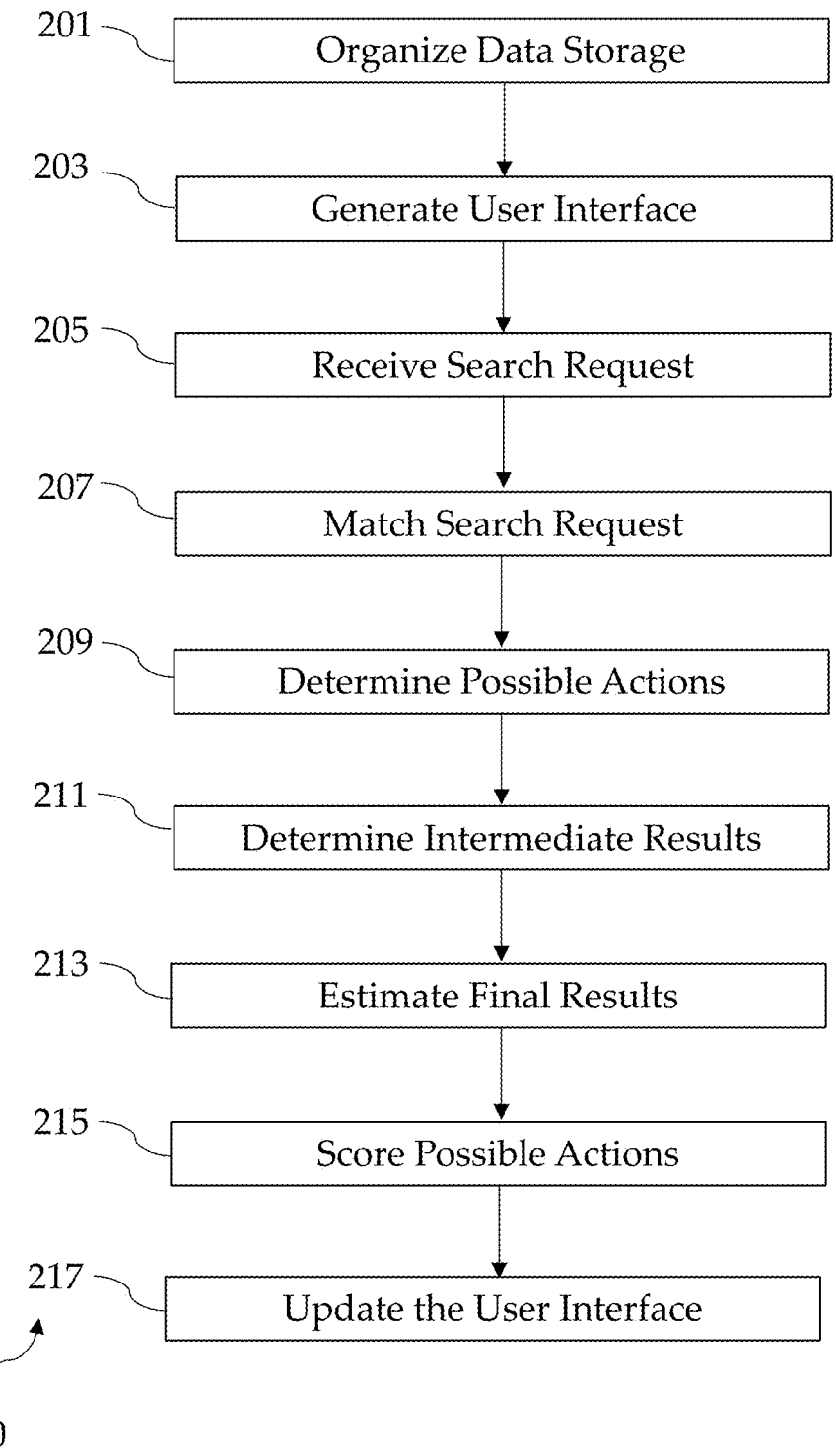
FIG. 2 shows a process for fulfilling a search request using the project management system in accordance with various embodiments.

FIG. 2 shows an exemplary process 200 for process for fulfilling a search request using the project management system 100 in accordance with the illustrative embodiment. Process 200 may be implemented in whole or in part in one or more of the project management systems disclosed herein. In certain forms, the functionalities may be performed by separate devices of the project management system. In certain forms, all functionalities may be performed by the same device. It shall be further appreciated that a number of variations and modifications to Process 200 are contemplated including, for example, the omission of one or more aspects of Process 200, the addition of further conditionals and operations, or the reorganization or separation of operations and conditionals into separate processes.

Figure 3:
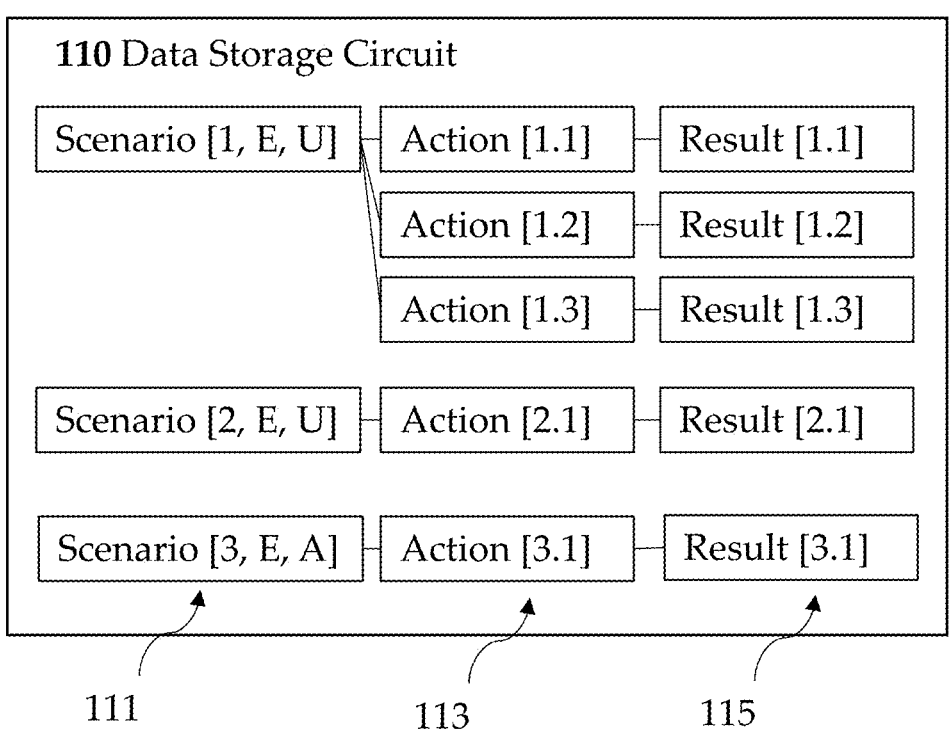
FIG. 3 schematically shows a data storage circuit in accordance with various embodiments.

The Process 200 begins at operation 201 where the data storage circuit 110 organizes data from completed projects, also known as historical project data. As shown in FIG. 3 schematically showing the data storage circuit 100, the historical project data may include items such as historical scenarios 111, historical actions 113, and historical project results 115, among other things. A historical scenario may identify a scenario encountered during a completed project. A historical action may identify an action taken in response to the historical result. A historical result may identify the result of a historical action.

In some embodiments, the historical project data stored using the data storage circuit 110 pertains to historical projects overseen by a single project manager. In other embodiments, the data stored using the data storage circuit 110 pertains to historical projects overseen by different project managers either at the same company or different companies.

The historical result may include the intermediate project result and/or the final project result of the action. The intermediate project result may include an adjustment to or updated cost as a result of the corresponding action at a time instant before the completion of the project, known as an intermediate cost result. The intermediate project result may include an adjustment to or updated schedule as a result of the corresponding action at a time instant before the completion of the project, known as an intermediate schedule result. The intermediate project result may include an adjustment to or updated scope as a result of the corresponding action at a time instant before the completion of the project, known as an intermediate scope result. The time instant may be on the day the action is taken, or a date of the next progress report for the project, among other things.

The final project result may include an adjustment to or updated cost as a result of the corresponding action at the completion of the project, known as a final cost result. The final project result may include an adjustment to or updated schedule as a result of the corresponding action at the completion of the project, known as a final schedule result. The final project result may include an adjustment to or updated scope as a result of the corresponding action at the completion of the project, known as a final scope result.

The organization of the historical project data may include associating historical actions with a historical scenario. In this way, the data storage circuit 110 represents the actions previously taken in response to the scenarios of the stored completed projects. The organization of the historical project data may also include associating historical each historical result with a historical action. In this way, the data storage circuit 110 represents the results of actions previously taken in response to scenarios of the completed projects.

In some embodiments, the organization includes additional items and associations, such as associating each historical scenario with a historical activity, as well as associating a historical activity with a historical project.

The data storage circuit 110 may associate data by arranging the data in a topology, such as a tree structure (as shown in FIG. 3), among other things. Alternatively or additionally, the data storage circuit 110 may associate data by adding metadata to items defining, among other things, a relationship between item, known as tagging (also show in FIG. 3). The metadata may also include an item identifier configured to identify the item or distinguish the items from other items stored by the data storage circuit 110.

The metadata may also include a categorical tag configured to associate an item with one or more other items. Similar activities, similar scenarios, or similar actions may be grouped using a categorical tag. For example, missing excavator equipment of an excavation activity and missing electrical conduit of an electrical installation activity may share the same categorical tag, since both scenarios involve missing items during a project activity. As described in more detail below, categorical tags may be used to identify more possible actions to use when fulfilling a search request.

The metadata may include a proficiency tag indicating whether the project management system 100 may request input from a project manager to respond to or complete an item and/or whether the project manager/other worker has the proficiency to respond. For example, a scenario may have a proficiency tag indicating a project manager has enough experience to respond correctly to the scenario. In another example, an action may have a proficiency tag indicating the construction crew has enough experience to complete the action in response to a scenario. The value of the proficiency tag may be based on the number of times the project manager/worker has addressed a similar scenario, among other things. For example, the proficiency tag may include a counter or the result of a comparison between the number of times a user has encountered the scenario and a threshold configured to indicate a proficiency in addresses the scenario.

In some embodiments, the proficiency tag may indicate whether the project management system 100 may decide on an action in response to a scenario. For example, the proficiency tag may indicate the project management system 100 may not decide on an action because the project management system 100 has insufficient data to make an informed decision. In another example, the proficiency tag may indicate the project management system 100 may decide on an action because the project management system 100 has high confidence in a selected action.

The metadata may also include an availability tag for an action indicating whether that action may be performed in response to a scenario. For example, an action of delaying a work crew project for a day may have a tag indicating the action is not available because the crew is not available the following day.

The Process 200 generates a project management interface 400, which is a graphical user interface, in operation 203. The project management interface 400 conveys information to a project manager and receives input, such as a search request, from the project manager, among other things. In some embodiments, the project management interface 400 includes an element for receiving the search request from a user. The element may be a text box, radio button, a checkbox, or a drop-down menu, among other things.

The Process 200 receives a search request identifying a scenario in operation 205. The search request may be received from a project manager by way of the project management interface 400. In some embodiments, the search request may be received from a circuit of the project management system 100 or another device. For example, the project management system 100 may receive weather data from an application programming interface indicating rain in the forecast. Search requests may also originate from outside vendors or contractors, among other things.

After receiving the search request, the Process 200 matches the search request to a historical scenario stored by the data storage circuit 210 in operation 207. The Process 200 may match by comparing text strings, stemming search results, selected boxes or menu items, or through natural language processing, among other things.

Using the search result, the Process 200 will attempt to determine the best responses for a scenario. In operation 209, the Process 200 determines the possible actions the project manager may choose to respond to the scenario. The process 200 may use the historical actions associated with the historical scenario matching the search request. The possible actions may then include some or all of the historical actions associated with the historical scenario. The process 200 may also use historical actions associated with historical scenarios which share a categorical tag with the historical scenario matching the search request. The possible actions may then include some or all of the historical actions associated with historical scenarios which share categorical tag with the historical scenario matching the search request. In some embodiments, the possible actions may include other historical actions based on the metadata of the historical actions.

Before ending operation 209, the Process 200 may filter out some of the actions, such as actions that cannot be performed. For example, the Process 200, using the metadata of one of historical actions, may determine equipment needed to complete the action is unavailable, or that the project manager/other worker lacks the proficiency to execute the action, among other things. The actions may also be filtered out because the project manager does not have the permissions or authority to select the action.

After the Process 200 determines the possible actions for responding to the scenario, the Process 200 evaluates the result of implementing each possible action on the goals of the project. In operation 211, the Process 200 determines the intermediate project result for each possible action. Determining the intermediate project result may include determining the point in time at which to evaluate the result of the possible actions. For example, the intermediate project results may be determined for the day of the scenario, or the day of the next progress report, among other things.

Determining the intermediate project result of an action may include determining a change in cost, a change in schedule, or a change in scope. Changes in cost, schedule, or scope may be determined by user input, or an evaluation of historical project results, among other things.

Evaluating the historical project results may include using a machine learning model to estimate the intermediate project result. For example, the Process 200 may train a machine learning model using training data of historical actions labeled with corresponding historical results. Once trained, the machine learning model may receive input of a possible action and output an estimated result of the action, including a change in cost, a change in schedule, or a change in scope, among other things.

In some embodiments, the determined intermediate project result is represented by a numerical value (e.g., $500, 3 days). In some embodiments, the determined intermediate project result is a represented by a probability (e.g., probability the action will cause a cost increase). In some embodiments, the determined intermediate project result is represented by a category selection (e.g., low impact, medium impact, high impact). In some embodiments, the determined intermediate project result is represented by a Boolean value (e.g., yes or no). In some embodiments, the determined intermediate project result is represented by one or more types of data for one or more of cost, schedule, or scope.

In operation 213, the Process 200 estimates the final project result for each possible action. The final project result of an action may include a change in cost, a change in schedule, or a change in scope. In certain embodiments, the project manager inputs at least a portion of the estimate. For example, the project manager may enter an estimate of a change in scope. In some embodiments, the project management system 100 uses historical project data and/or other project data to estimate the final project results.

Estimating the final cost result may include training and implementing a supervised machine learning model. For example, the Process 200 may train a machine learning model using training data of historical actions labeled with historical final cost results, historical final schedule results, or historical final scope results. Once trained, the machine learning model may receive an input of a possible action and output an estimated final cost result of the action. In some embodiments, the machine learning model may output a preliminary cost result, a final schedule result, and or a final scope result. Using the final schedule result and the final scope result, the project management system 100 may adjust the preliminary cost result. For example, the final schedule result as well as logical expression of a fine structured may be used to determine the possible action would delay the project to the extent fines would be incurred, adding to the final cost result of the action. In another example, the final scope result and a logical expression of a fee structure may be used to determine the possible action would cause an expansion of the scope of work, increasing the cost of construction and adding to the final cost result of the action.

Estimating the final schedule result may include training and implementing a machine learning model. For example, the Process 200 may train a supervised machine learning model using training data of historical activities, historical scenarios, historical actions labeled with historical final cost results, historical final schedule results, or historical final scope results. Once trained, the machine learning model may receive an input of a possible action and output an estimated final schedule result of the action. In some embodiments, the machine learning model may receive an input of the possible action as well as a context of the possible action. The context may include the corresponding scenario, the corresponding activity, the determined intermediate cost, the current project schedule, weather data, irradiance data, temperature data, labor availability data, or equipment availability data, among other things. Using the context, the machine learning model may be able to estimate a final schedule result which is better than the intermediate schedule result. For example, the action may cause an intermediate delay of 10 days while the equipment is delayed, but the machine learning model, taking into account the number of activities remaining in the project, may estimate the final schedule result is a delay of only 2 days.

In some embodiments, estimating the final schedule result may use the critical path theory, whereby some of the activities which determine a schedule for other activities are considered to be critical path activities. In some embodiments, the action may cause one of the activities to change a designation from a non-critical path activity to a critical path activity. Where the activity becomes designated as a critical path activity, the process 200 may determine the action contributed to the schedule adjustment (e.g., delay) of the project. When an action causes one of the non-critical path activities to adjust the schedule of the project, the final schedule result may include the schedule adjustment of a critical activity given the action.

In some embodiments, the machine learning model may output a cost result, a preliminary schedule result, and/or a final scope result. Using the final cost result and the final scope result, the project management system 100 may adjust the preliminary schedule result. For example, the final scope result may be used to determine additional time will be needed to complete the project due to an increase in the scope of the work.

In some embodiments, the estimated final project result is represented by a numerical value (e.g., $500, 3 days). In some embodiments, the estimated final project result is a represented by a probability (e.g., probability action will cause a cost increase). In some embodiments, the estimated final project result is represented by a category selection (e.g., low impact, medium impact, high impact). In some embodiments, the estimated final project result is represented by a Boolean value (e.g., yes or no). In some embodiments, the estimated final project result is represented by one or more types of data for one or more of cost, schedule, or scope.

For the purposes of illustration, a project manager may encounter a scenario where the client wants to add a room to an existing project. To determine the estimate final cost result or final schedule result, the machine learning model may be trained using historical data including counts of scope changes and their corresponding effects on historical projects, or counts of scope changes and their corresponding effects on historical projects. Once trained, the machine learning model may receive a count/updated count of scope changes for the current project and, in response, output an estimated final cost result or final schedule result.

After the Process 200 has the intermediate project results and the final project results for each of the possible actions, the Process 200 scores the possible actions. The scores may be based on the intermediate project results and/or the final project results. The scores may be based on additional data, such as the tags stored in the data storage circuit 110.

In some embodiments, the Process 200 uses a weighted arithmetic expression to determine the score. For example, each intermediate project result and/or final project result may be assigned a weight. Each weight may be determined based on a user input or an evaluation of historical data. For example, Process 200 may determine a project manager's propensity for selecting actions which prioritize one of the cost goal, the schedule goal, or the scope goal by analyzing the previous selected actions. In another example, the Process 200 may assign a higher weight to final project results for a project manager where historical actions and corresponding results indicate a preference for improving the final project results over the intermediate project results.

In some embodiments, the score accounts for the selection counts of the historical actions by the project manager. For example, the process 200 may assign a higher score to an action the project manager has selected 10 times over the past 15 times the scenario has arisen over an action the project manager has only selected one over the same past 15 times.

In some embodiments, the score accounts for project manager error in estimating cost, schedule, or scope results. For example, where a project manager has routinely underestimated the time an action will delay a project, the score may adjust the score by the value of an average error to compensate for the underestimation.

In some embodiments, the score accounts for project manager/worker proficiency. For example, knowing a worker is relatively new based on a count, the score may account for a level of difficulty of the action. For example, the score may be higher for an action of sending a crew home over an action of sending the crew to operate heavy machinery for the first time without supervision. To account for project manager/working proficiency and/or task difficulty, corresponding tags, such as the proficiency tag, may be assigned to the historical actions using the data storage circuit 110.

In some embodiments, the score may be adjusted based on whether the possible action was added because of a tag. For example, possible actions identified based on a categorical tag may have a lower score relative to the possible action previously selected for the current scenario.

In some embodiments, the score may account for whether historical selections were made by the project manager or by a user at another company, or another project manager at the same company. Higher scores may be assigned to project managers having a high proficiency.

In some embodiments, the process 200 assigned a score based on logical expression. For example, the process 200 may assign a zero score where an availability tag indicates the equipment is not available for the possible action.

In some embodiments, process 200 assigns scores based on the estimated deviation from the goals of the project.

The Process 200 proceeds to operation 217, where the process 200 updates the project management interface 400 in response to scoring the possible actions.

In some embodiments, updating the project management interface 400 includes displaying a list of the possible actions. The list may include some or all of the possible actions determined in operation 209. The list may be ranked according to the score or scores assigned to each of the possible actions.

In some embodiments, the project management system 100 determines a portion of the possible actions to display with the project management interface 400. In some embodiments, the portion is determined by comparing the score associated with each possible action to a threshold representing a minimum benefit to the project goals. For example, where the threshold indicates a selection must not deviate from the goals of the project by more than ten percent, the portion would not include a possible action with an estimated final cost result indicating an 11 percent cost overrun.

In some embodiments, the project management interface 400, after displaying the list of a possible actions, may also include an element allowing the project manager to select an unlisted action. The element may include a text box, among other things. As with the results of other projects, the results of the project, including the new action, may be added to the data storage circuit 110 for analysis for future projects.

In some embodiments, the project management system 100 may update the project management interface 400 based on a frequency or count of the scenario occurring in the historical project data. For example, if the project manager has encountered the scenario more times than a count threshold, the project management interface 400 may display a notification to the project manager notifying the project manager the scenario is a common occurrence and/or suggesting a new course of action to avoid the scenario in the future. For example, if a particular equipment supplier regularly does not have equipment available at the scheduled time, the notification may suggest choosing another vendor and listing reliable vendors based on historical project data. In another example, the interface may notify the project manager that the scenario is a reoccurring issue based on the historical project data and prompt the project manager to input an action without listing the search results for the project manager.

In some embodiments, the project management interface 400 may display a modified list in addition to notification. The list may be modified by removing frequently chosen responses to the reoccurring scenario. The list may also be modified to include actions taken in similar scenarios according to a categorical tag, but not taken with the current scenario. In some embodiments, the project management interface 400 may provide and receive a selection of a preventative action which is added to a template for future projects in response to the notification.

In some embodiments, the project management system 100 updates the project management interface by displaying the list of possible actions in response to determining the project management system 100 cannot automatically select an action due to a lack of data, among other things. For example, the project management system 100 may output the list of possible actions when the scenario occurs during the last activity and the system 100 does not have enough historical data to determine an action to address the scenario and progress towards the goals of the project.

In some embodiments, the project management system 100 may use a system confidence score to determine whether to output the list of possible actions. The project management system 100 may use a machine learning model to determine the system confidence score. The project management system 100 may first train a supervised machine learning model using the historical data. The trained machine learning model may use data about the current scenario to output the system confidence score for one or more of the actions. Where the system confidence score is below a threshold, indicating the system does not know whether the possible action, the project management interface 400 may respond by displaying the list of possible actions to the user.

For the purposes of illustration, the following is a use case for the Process 200. An electrician has been assigned an electrical wiring activity for an office building project. According to the project schedule, the electrician should begin tomorrow, but the electrician has just told the project manager that they cannot begin work for a month. With an organized data storage and a project management interface 400 already generated (operations 201 and 203), the project manager submits a search request (operation 205) identifying the scenario (contractor unavailable for wiring activity). Operation 207 matches the project manager's search request with historical scenarios stored in the data storage. Operation 209 may determine all the previous responses to the historical scenarios by determining the historical actions associated with the historical scenarios. The possible actions for responding to the current scenario include the determined historical actions, though other possible actions may be included based on tags, among other things.

For each of the possible actions, operation 211 determines the intermediate project results if the action were taken, including the effect on cost, schedule, and scope. The intermediate project results may be determined by receiving user input from the project manager who estimates the intermediate effect of the action. Operation 213 estimates the effect of each action on the completed project, including the effect on cost, schedule, and scope. Operation 215 scores each action using the results from operations 211 and 213. Since the project manager has prioritized staying on schedule over other goals according to the historical project data stored in the data storage, weights are assigned to each of the intermediate project results and final project results, with the intermediate and final schedule results receiving higher weights. Using the weighted expression, each action receives a score. In operation 217, the project management interface 400 displays the possible actions ranked according to the corresponding scores. For example, the top ranked action may be terminating the electrician and hiring another electrician who, in the past, has stepped into projects and made up for lost time caused by other contractors. The final schedule result may indicate the project will still finish on time, compared to the other options which are estimated to cause at least some delay to the completion of the project. Other examples of actions may include rescheduling other activities which can be completed without first completing the wiring activity, or reducing the scope of the wiring activity.

Figure 4A:
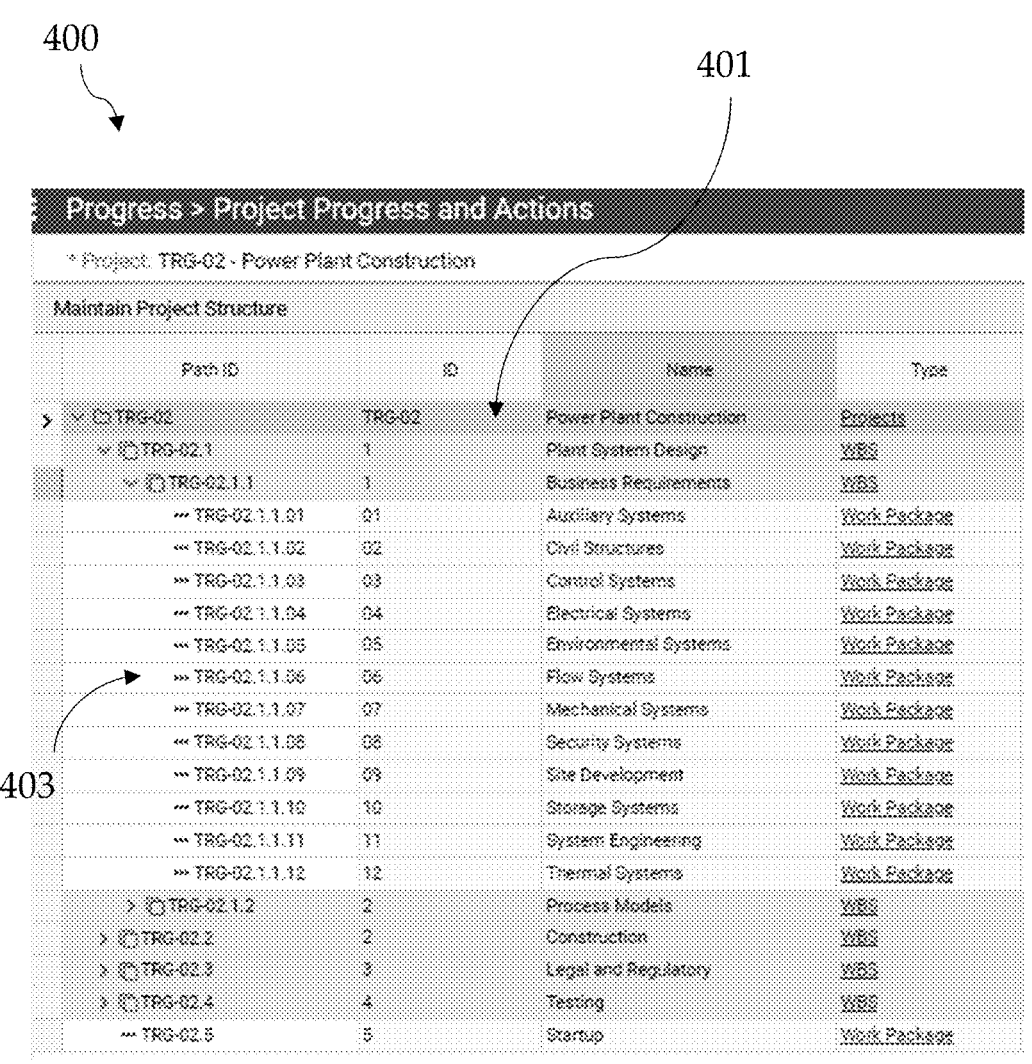
FIG. 4A-4B schematically show a project management interface fulfilling a search request in accordance with various embodiments.
Figure 4B:
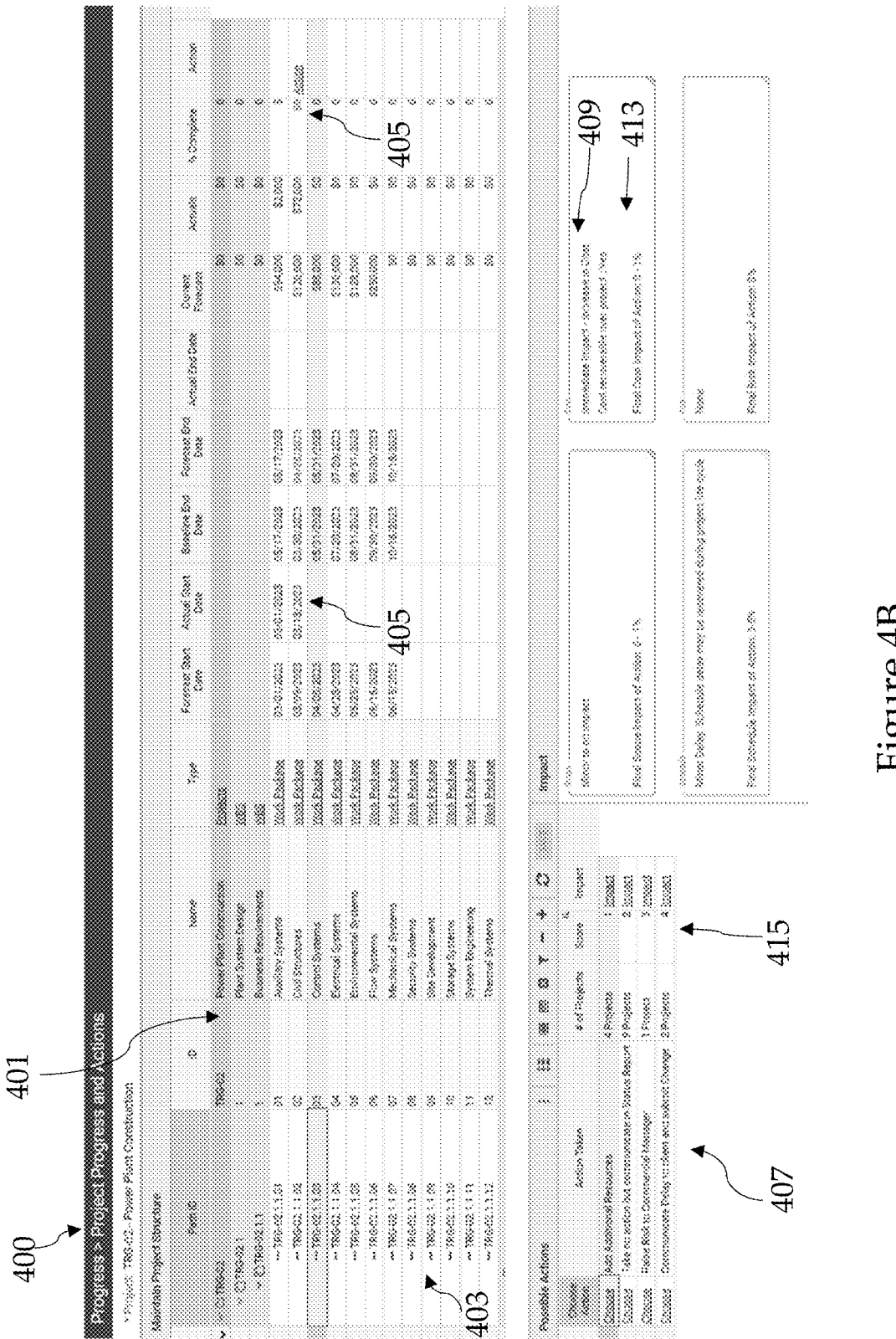

FIGS. 4A and 4B show the project management interface 400 before and after submitting a search request in accordance with various embodiments. The project management interface 400 includes a project section 401, where the visualized project is identified. In the illustrated embodiment, only one project is displayed. In other embodiments, the project management interface 400 may display more than one project at a time.

The project management interface 400 includes an activity section 403, where the activities, also known as work packages, of the project are displayed. The activities may be listed in the order in which they will need to be completed, among other things. In in illustrated embodiment, the project management interface 400 also includes a work breakdown structure, which denotes groups of activities. For example, the displayed activities have been grouped under the work breakdown structure named "Business Requirements." In the column entitled "Type," each row is designated as a pertaining to a project, a work breakdown structure, or a work package.

The project management interface 400 includes one or more user input elements 405 where the project manager may enter a search request identifying a scenario. In the illustrated embodiment, when a project manager submits a search request using user input element 405, the project management interface 400 associates the scenario to activity number three and may include the association in the search request. In the illustrated embodiments, the user has entered a scenario using two user input elements 405. Namely, the search request has indicated a scenario where activity three will begin three days late and is overbudget given the scope completed and the actual cost for the activity compared to the forecasted budget.

FIG. 4B shows the project management interface 400 after submitting the search request and receiving possible actions from the scoring circuit 140. The project management interface 400 now has an action section 407 populated with a list of possible actions identified by the request analysis circuit 130. As illustrated, the action section may also include an element (i.e., plus sign in the heading) the project manager may use to enter, and thereby select, an action which was not listed. The illustrated action section 407 has an element for selecting each action in the first column, a description of the possible action in the second column, and a historical count of the number of times the possible action has been taken in previous projects in the third column. In the fourth column, scores for each possible action are displayed, with the possible actions being ranked and ordered by the scores. In the final column, there is a selectable element to display the impact of the possible action, which may include the intermediate project results, such as intermediate cost result 409 or the final project results, such as final cost result 413, corresponding to one or more goals of the construction project.

In some embodiments, the displayed intermediate project results may include the intermediate scope result, the intermediate schedule result, or the intermediate cost result. The displayed final project results may, for each action, the final scope result, the final schedule result, or the final cost result. As illustrated, some of the actions have a result of no change for at least one of the cost, schedule, or scope. The order of the result columns may be determined by the weight assigned to each of the results, or based on a determination of project manager preference for the different types of results.

In the illustrated embodiment, the scope results include a categorical value, and probability value; the schedule results include a categorical value and a probability value; and the cost results include a categorical value, Boolean value, and probability value. In other embodiments, the results may include different types of data or a different combination of data.

The project management interface 400 has score section 415, where the determined overall scores for each of the possible actions determined by the scoring circuit 140 is displayed. In other embodiments, the scoring circuit 140 determines an intermediate score and a final score for each possible action instead of a single score. In the illustrated embodiment, the actions have been ranked according to the scores. In other embodiments, the actions may be ranked according to another metric, such as the intermediate score, final score, or the values of one of the results, among other things.

Figure 5:
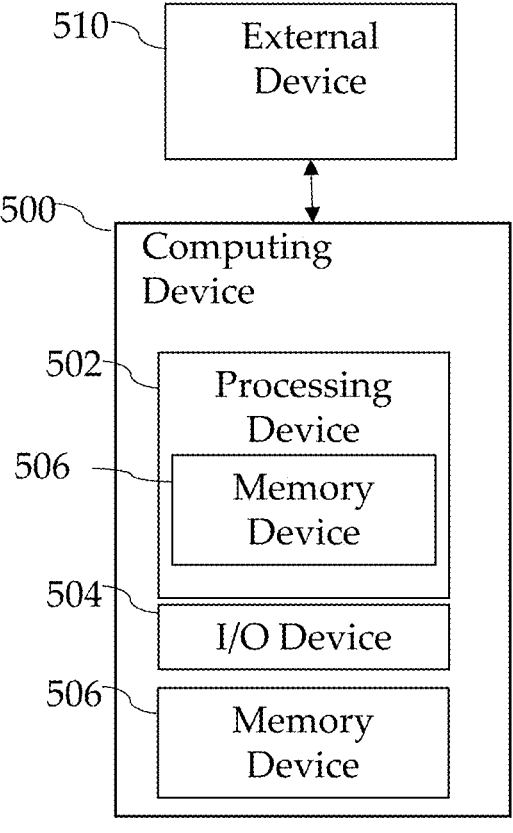
FIG. 5 schematically shows a computing device in accordance with various embodiments.

FIG. 5 schematically shows a computing device 500 in accordance with various embodiments. The computing device 500 is one example of a computing device used in the project management system 100 in FIG. 1, such as the data storage circuit 110, the project management interface circuit 120, the request analysis circuit 130, or the scoring circuit 140, among other things. The computing device 500 includes a processing device 502, an input/output device 504, and a memory device 506. The computing device 500 may be a stand-alone device, an embedded system, or a plurality of devices configured to perform the functions described with respect to one of the components of the project management system 10. Furthermore, the computing device 500 may communicate with one or more external devices 510.

The input/output device 504 enables the computing device 500 to communicate with an external device 510. For example, the input/output device 504 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), among other things. The input/output device 504 may be comprised of hardware, software, and/or firmware. It is contemplated that the input/output device 504 has more than one of these adapters, credentials, or ports, such as a first port for receiving data and a second port for transmitting data.

The external device 510 may be any type of device that allows data to be input or output from the computing device 500. For example, external device 510 in different embodiments is a meter, a control system, a sensor, a mobile device, a reader device, equipment, a handheld computer, a diagnostic tool, a controller, a computer, a server, a printer, a display, a visual indicator, a keyboard, a mouse, a touch screen display, among other things. Furthermore, the external device 510 may be integrated into the computing device 500. More than one external device may be in communication with the computing device 500.

The processing device 502 may be a programmable type, a dedicated, hardwired state machine, or a combination of these. The processing device 502 may further include multiple processors, Arithmetic-Logic Units (ALUs), Central Processing Units (CPUs), Digital Signal Processors (DSPs), Field-programmable Gate Array (FPGA), among other things. For forms of the processing device 502 with multiple processing units, distributed, pipelined, or parallel processing may be used. The processing device 502 may be dedicated to performance of just the operations described herein or may be used in one or more additional applications. The processing device 502 may be of a programmable variety that executes processes and processes data in accordance with programming instructions (such as software or firmware) stored in the memory device 506. Alternatively or additionally, programming instructions are at least partially defined by hardwired logic or other hardware. The processing device 502 may be comprised of one or more components of any type suitable to process the signals received from the input/output device 504 or elsewhere, and provide desired output signals. Such components may include digital circuitry, analog circuitry, or a combination of both.

The memory device 506 in different embodiments may be of one or more types, such as a solid-state variety, electromagnetic variety, optical variety, or a combination of these forms, to name but a few examples. Furthermore, the memory device 506 may be volatile, nonvolatile, transitory, non-transitory or a combination of these types, and some or all of the memory device 506 may be of a portable variety, such as a disk, tape, memory stick, or cartridge, to name but a few examples. In addition, the memory device 506 may store data that is manipulated by the processing device 502, such as data representative of signals received from or sent to the input/output device 504 in addition to or in lieu of storing programming instructions, among other things. As shown in FIG. 5, the memory device 506 may be included with the processing device 502 or coupled to the processing device 502, but need not be included with both.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional term "having" is open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. A method implemented in a project management system including one or more operatively coupled circuits, comprising:

associating, using a data storage circuit of the project management system, a historical scenario with a plurality of historical actions;

associating, using the data storage circuit of the project management system, a plurality of historical project results with the plurality of historical actions, the plurality of historical project results including a cost result, a scope result, and a schedule result;

generating, by a project management interface circuit of the project management system, a project management interface;

receiving, by a request analysis circuit of the project management system, a search request from the project management interface;

matching, by the request analysis circuit of the project management system, the search request to the historical scenario;

determining, by the request analysis circuit of the project management system, a plurality of possible actions, using the plurality of historical actions associated with the historical scenario, in response to matching the search request to the historical scenario;

determining, by a scoring circuit of the project management system, a plurality of intermediate project results for the plurality of possible actions, each of the plurality of intermediate project results including an intermediate cost result, an intermediate scope result, and an intermediate schedule result;

estimating, by the scoring circuit of the project management system, a plurality of final project results for the plurality of possible actions using a machine learning model trained with historical project data, each of the plurality of final project results including a final cost result, a final scope result, and a final schedule result;

scoring, by the scoring circuit of the project management system, the plurality of possible actions according to at least one of the plurality of intermediate project results, or the plurality of estimated final project results;

filtering out, by the request analysis circuit of the project management system, one or more first actions of the plurality of possible actions based upon a determination that the one or more first actions of the plurality of possible actions cannot be performed, the determination being based on metadata including a proficiency tag associated with the historical actions;

generating a set of one or more second actions from the plurality of possible actions;

updating, by the project management interface circuit of the project management system, the project management interface in response to scoring and filtering the plurality of possible actions, the updating comprising:

displaying, in an action section of the project management interface, a ranked list of the one or more second actions ordered according to the scoring, including a selectable element configured to allow selection of the possible action, and providing, for each displayed action, a user-selectable element configured to display an impact view including at least one of the intermediate project results or the final project results corresponding to the action; and selecting, by the request analysis circuit of the project management system, an action from the one or more second actions of the plurality of possible actions for implementation based upon a proficiency tag for that action indicating a confidence for that action being above a threshold.

2. The method of claim 1, comprising:

ranking, by the scoring circuit of the project management system, the plurality of possible actions using the scoring, wherein updating the project management interface includes outputting a ranking of at least a portion of the plurality of possible actions based on the scoring.

3. The method of claim 2, comprising:

selecting, by the scoring circuit of the project management system, the portion of the plurality of possible actions based on the scoring exceeding a minimum benefit threshold.

4. The method of claim 1, comprising assigning, by the scoring circuit of the project management system, weights to the final cost result, the final scope result, and the final schedule result, wherein scoring the plurality of possible actions is further using the assigned weights.

5. The method of claim 1, comprising assigning, by the data storage circuit of the project management system, a categorical tag to the first historical scenario and a second historical scenario, the second historical scenario being associated with a second plurality of historical actions, wherein determining the plurality of possible actions includes using the second plurality of historical actions in response to matching the categorical tag.

6. The method of claim 1, comprising:

after updating the project management interface, receiving a user input including an additional possible action and a selection of the additional possible action; and adding the additional possible action to the plurality of historical actions.

7. The method of claim 1, wherein estimating the final project result for one of the plurality of possible actions includes:

training a machine learning model using the plurality of historical project results and the plurality of historical actions;

inputting one possible action of the plurality of possible actions into the machine learning model; and outputting the estimated final project result for the one possible action.

8. The method of claim 1, wherein updating the project management interface occurs in response to determining a system confidence score is less than a confidence threshold and a user competency score is greater than a competency threshold.

9. A project management system, comprising:

a data storage circuit configured to store a historical scenario, a plurality of historical actions associated with the historical scenario, and a plurality of historical project results associated with the plurality of historical actions, the plurality of historical project results including a cost result, a scope result, and a schedule result;

a project management interface circuit configured to generate a project management interface;

a request analysis circuit configured to receive a search request from the project management interface, match the search request to the historical, and determine a plurality of possible actions, using the plurality of historical actions associated with the historical scenario, in response to matching the search request to the historical scenario; and a scoring circuit configured to:

determine a plurality of intermediate project results for the plurality of possible actions, each of the plurality of intermediate project results including an intermediate cost result, an intermediate scope result, and an intermediate schedule result, estimate a plurality of final project results for the plurality of possible actions using a machine learning model trained with historical project data, each of the plurality of final project results including a final cost result, a final scope result, and a final schedule result, score the plurality of possible actions according to at least one of the plurality of intermediate project results or the plurality of estimated final project results, filter out, by the request analysis circuit of the project management system, one or more first actions of the plurality of possible actions based upon a determination that the one or more first actions of the plurality of possible actions cannot be performed, the determination being based on metadata including an availability tag or a proficiency tag associated with the historical actions, generate a set of one or more second actions from the plurality of possible actions, wherein the project management interface circuit is configured to update the project management interface in response to scoring and filtering the plurality of possible actions, the update comprising:

displaying, in an action section of the project management interface, a ranked list of the one or more second actions ordered according to the scoring, including a selectable element configured to allow selection of the possible action, providing, for each displayed action, a user-selectable element configured to display an impact view including at least one of the intermediate project results or the final project results corresponding to the action, and wherein the request analysis circuit is further configured to select on an action of the one or more second actions of the plurality of possible actions for implementation based upon a proficiency tag for that action indicating a confidence for that action being above a threshold.

10. The project management system of claim 9, wherein the scoring circuit ranks the plurality of possible actions using the scoring, and wherein updating the project management interface includes outputting a ranking of at least a portion of the plurality of possible actions based on the scoring.

11. The project management system of claim 10, wherein the scoring circuit selects the portion of the plurality of possible actions based on the scoring exceeding a minimum benefit threshold.

12. The project management system of claim 9, wherein the scoring circuit assigns weights to the final cost result, the final scope result, and the final schedule result, and scores the plurality of possible actions according to the assigned weights.

13. The project management system of claim 9, where using the data storage circuit assigns a categorical tag to the first historical scenario and a second historical scenario, the second historical scenario being associated with a second plurality of historical actions, wherein determining the plurality of possible actions includes using the second plurality of historical actions in response to matching the categorical tag.

14. The project management system of claim 9, wherein estimating the final project result for one of the plurality of possible actions includes:

training a machine learning model using the plurality of historical project results and the plurality of historical actions;

inputting one possible action of the plurality of possible actions into the machine learning model; and outputting the estimated final project result for the one possible action.

15. The project management system of claim 9, wherein updating the project management interface occurs in response to determining a system confidence score is less than a confidence threshold or a user competency score is greater than a competency threshold.

16. A computer program product for use on a computer system including a processor and a memory operatively coupled with the processor, the computer program product comprising a tangible, non-transient computer usable medium having computer readable program code executable by the processor thereon, the computer readable program code comprising:

program code for associating, using a data storage circuit, a historical scenario with a plurality of historical actions;

program code for associating, using the data storage circuit, a plurality of historical project results with the plurality of historical actions, the plurality of historical project results including a cost result, a scope result, and a schedule result;

program code for generating, by a project management interface circuit, a project management interface;

program code for receiving, by a request analysis circuit, a search request from the project management interface;

program code for matching, by the request analysis circuit, the search request to the historical scenario;

program code for determining, by the request analysis circuit, a plurality of possible actions, using the plurality of historical actions associated with the historical scenario, in response to matching the search request to the historical scenario;

program code for determining, by a scoring circuit, a plurality of intermediate project results for the plurality of possible actions, each of the plurality of intermediate project results including an intermediate cost result, an intermediate scope result, and an intermediate schedule result;

program code for estimating, by a scoring circuit, a plurality of final project results for the plurality of possible actions using a machine learning model trained with historical project data, each of the plurality of final project results including a final cost result, a final scope result, and a final schedule result;

program code for scoring, by the scoring circuit, the plurality of possible actions according to at least one of the plurality of intermediate project results or the plurality of estimated final project results;

program code for filtering out, by the request analysis circuit of the project management system, one or more first actions of the plurality of possible actions based upon a determination that the one or more first actions of the plurality of possible actions cannot be performed, the determination being based on metadata including a proficiency tag associated with the historical;

program code for generating a set of one or more second actions from of the plurality of possible actions;

program code for updating, by the project management interface circuit of the project management system, the project management interface in response to scoring and filtering the plurality of possible actions, the updating comprising:

displaying, in an action section of the project management interface, a ranked list of the one or more second actions ordered according to the scoring, including a selectable element configured to allow selection of the possible action;

providing, for each displayed action, a user-selectable element configured to display an impact view including at least one of the intermediate project results or the final project results corresponding to the action; and program code for selecting, by the request analysis circuit, on an action of the set of one or more second actions of the plurality of possible actions for implementation based upon a proficiency tag for that action indicating a confidence for that action being above a threshold.

17. The computer program product of claim 16, comprising:

program code for ranking, by the scoring circuit, the plurality of possible actions using the scoring selecting a portion of the plurality of possible actions based on the scoring exceeding a minimum benefit threshold, wherein updating the project management interface includes outputting a ranking of at least a portion of the plurality of possible actions based on the scoring.

18. The computer program product of claim 16, comprising assigning, by the scoring circuit, weights to the final cost result, the final scope result, and the final schedule result, wherein scoring the plurality of possible actions is further according to the assigned weights.

19. The computer program product of claim 16, comprising:

program code for, after updating the project management interface, receiving a user input including an additional possible action and a selection of the additional possible action; and program code for adding the additional possible action to the plurality of historical actions.

20. The computer program product of claim 16, wherein estimating the final project result for one of the plurality of possible actions includes:

training a machine learning model using a plurality of historical project results and the plurality of historical actions;

inputting one possible action of the plurality of possible actions into the machine learning model; and outputting the estimated final project result for the one possible action.

\* \* \* \* \*